(12) United States Patent
Allegri

(10) Patent No.: US 11,416,731 B2
(45) Date of Patent: Aug. 16, 2022

(54) ARRANGEMENT AND METHOD FOR COUNTING ARTICLES

(71) Applicant: IKEA SUPPLY AG, Pratteln (CH)

(72) Inventor: Roberto Allegri, Parma (IT)

(73) Assignee: IKEA SUPPLY AG, Pratteln (CH)

(*) Notice: Subject to any disclaimer, the term of this patent is extended or adjusted under 35 U.S.C. 154(b) by 483 days.

(21) Appl. No.: 15/541,284

(22) PCT Filed: Dec. 31, 2014

(86) PCT No.: PCT/EP2014/079502
§ 371 (c)(1),
(2) Date: Jun. 30, 2017

(87) PCT Pub. No.: WO2016/107659
PCT Pub. Date: Jul. 7, 2016

(65) Prior Publication Data
US 2018/0018552 A1 Jan. 18, 2018

(51) Int. Cl.
*G06M 1/10* (2006.01)
*G01V 8/20* (2006.01)
*G06M 7/00* (2006.01)

(52) U.S. Cl.
CPC .............. *G06M 1/101* (2013.01); *G01V 8/20* (2013.01); *G06M 7/00* (2013.01)

(58) Field of Classification Search
CPC .............. G01V 8/20; B07C 5/10; G01B 11/02
(Continued)

(56) References Cited

U.S. PATENT DOCUMENTS 3,835,306 A * 9/1974 Bills .................. G06M 9/00
377/53
5,373,363 A * 12/1994 Kobayashi .......... G01B 11/043
250/559.26
(Continued)

FOREIGN PATENT DOCUMENTS

EP     0984391 A1   3/2000
GB     2203540 A    10/1998

OTHER PUBLICATIONS

International Search Report for PCT/EP2014/079502, dated Sep. 4, 2015.
(Continued)

*Primary Examiner* — Georgia Y Epps
*Assistant Examiner* — Kevin Wyatt
(74) *Attorney, Agent, or Firm* — Merchant & Gould P.C.

(57) ABSTRACT

A method and an arrangement for detecting and counting articles are disclosed, performing the steps of:
providing a detecting station arranged along a passageway for the articles, the detecting station being adapted to establish at least a scanning radiation beam at a cross section of the passageway;
passing articles past the detecting station, the detecting station detecting an article upon sensing at least a partial interruption of the scanning radiation beam; and
obtaining a count of the detected articles through the passageway, wherein the detecting station include first and second detecting assembly arranged at a predetermined distance from each other along the direction of travel of the articles, which first and second detecting assembly establish a respective scanning radiation beam on a first, respectively second scanning plane at a corresponding cross section of the passageway, and wherein
at least a first predetermined reference section of the articles is detected at each scanning plane;

(Continued)

a travelling speed of each article is calculated based on the time used by the at least one reference section of the article to travel the predetermined distance between the first and the second scanning planes;

at least a second predetermined reference section of the articles, which is separate from the first reference section, is detected at least at one of the first and second scanning plane; and a count of the articles is obtained by calculating a length thereof from the calculated travelling speed and by calculating the time used by the article to cross at least one of said first and second scanning plane.

20 Claims, 7 Drawing Sheets

(58) Field of Classification Search
USPC .......................................................... 209/586
See application file for complete search history.

(56) References Cited

U.S. PATENT DOCUMENTS

| | | | |
|---|---|---|---|
| 5,454,016 A | 9/1995 | Holmes | |
| 5,768,327 A | 6/1998 | Pinto et al. | |
| 6,380,503 B1 * | 4/2002 | Mills | B07C 5/10 209/579 |
| 6,836,527 B1 * | 12/2004 | Wooldridge | G01V 8/20 250/221 |
| 8,466,380 B2 * | 6/2013 | Inoue | G01G 13/08 177/145 |
| 2002/0175049 A1 * | 11/2002 | Flores | B07C 5/36 198/502.3 |
| 2003/0080286 A1 * | 5/2003 | Baird | B07C 5/06 250/223 R |
| 2007/0205083 A1 * | 9/2007 | Smalley | B65G 43/08 198/412 |
| 2009/0219529 A1 | 9/2009 | Dietrich et al. | |

OTHER PUBLICATIONS

European Search Report for EP Application No. 14827458.2 dated Jun. 17, 2021 (5 pages).

* cited by examiner

ARRANGEMENT AND METHOD FOR COUNTING ARTICLES

This application is a National Stage Application of PCT/EP2014/079502 filed 31 Dec. 2014, which application is incorporated herein by reference. To the extent appropriate, a claim of priority is made to the above disclosed application.

The present invention generally relates to methods and arrangements for detecting and counting articles such as in a production or distribution line where articles are conveyed along a path and are gathered in batches at the end of the path for further handling.

More particularly, the present invention relates to a method for detecting and counting articles according to the preamble of claim 1 and to an arrangement for detecting and counting articles according to the preamble of claim 13.

In the following description the term "article" means any countable item or object, e.g. a piece of a complex product, that has known shape and dimensions.

Methods and systems for detecting and counting articles travelling along a guided path, such as a passageway between a feeding station and a collecting station, are known in the art. Prior art systems comprise a detecting station arranged along the passageway where a radiation field, typically a light beam, is established at a predetermined scanning plane across the passageway so that an article crossing the scanning plane affects the radiation field to an extent that its presence is detected, and a number of articles travelling one after another along the passageway may be consequently counted.

A detecting station of this sort generally comprises a light source arranged for emitting a scanning light beam at least on a scanning plane, and a light sensor facing the light source and arranged for picking the scanning light beam on the scanning plane. The light sensor is arranged for receiving an amount of light that depends upon the presence and shape of a crossing object that provides a shading effect of the scanning light beam, i.e. the light sensor is adapted to discriminate at least a partial interruption of the light beam due to the presence and shape of an object. A processing unit associated with the detecting station is arranged for measuring the travelling time of the articles through the detecting station depending upon the time the scanning light beam is at least partially interrupted, and for evaluating the number and volume of the crossing objects based on the amount of light received at the light sensor over time.

Prior art detecting stations using more than one beam of light radiated along different directions are also well known in the art for detecting and counting asymmetrical articles that could pass undetected if their orientation was parallel to a light source and their size was smaller than the minimum size detectable by the optical sensor area. Two orthogonal light beams are used to allow measuring the volume of an article.

U.S. Pat. No. 5,454,016 discloses a method and an apparatus for detecting and counting articles as they are carried along or allowed to fall through a passageway across which a light beam extends and through which the articles are constrained to pass. More particularly, U.S. Pat. No. 5,454,016 is directed to a method and an apparatus for detecting articles by providing a pair of crossed light beams at a sensing plane in the passageway, to permit the detection of articles that pass through the crossed light beams, wherein the detection is independent of the orientation of the articles relative to the respective light sources, and for accurately counting the articles regardless of their shape and their orientation relative to the respective light beams.

A pair of light sources are positioned in the passageway and are oriented to provide crossing light beams that extend across the passageway. A pair of light detectors is so positioned opposite respective ones of the light sources so that the light from each light source is received by only one of the detectors. Each detector provides an individual output signal that is representative of a change in the amount of light reaching the detector when an article to be counted passes through the light beam provided by the light source. The light beams and detectors are operated alternately, so that light from one light source does not impinge on or influence the output of the detector that is opposite to the other light source. The resulting individual output signals from each light detector are combined to provide an equivalent article volume representative of the calculated volume of the article, which is compared with a predetermined article volume to determine whether the article should be counted.

U.S. Pat. No. 6,836,527 discloses an improved method for counting irregular and asymmetrical articles of an arbitrary shape and size. To this aim U.S. Pat. No. 6,836,527 discloses at least a pair of orthogonally positioned light sources and respective orthogonally positioned light detectors that provide crossing light beams that extend across the passageway at a detection station. The light sources are operated alternately as the articles pass through the detection station. This allows the user to obtain a plurality of article scans by sensing the quantity of light that is detected by each light detector and providing electrical signals representative of the amounts of light received by the respective light detectors. The electrical signals are stored along with the times corresponding with each signal. An actual volume is obtained for each article and the actual volume is compared to a predetermined volume for each article to obtain a count portion. This allows the user to count articles that are broken or not whole, complete articles. The count portions of each article are added together to obtain a total batch volume, which is an accurate calculation compared with those obtained in previous counting methods due to using actual volumes instead of estimated volumes.

According to the prior art teachings of U.S. Pat. Nos. 5,454,016 and 6,836,527 depending on the detected quantity of light a volume for an article may be estimated and the articles travelling along the passageway may be counted. Depending on the count of articles, known diverting means downstream the passageway may be actuated so as to sort the articles in predetermined batches at a collecting station.

The detection arrangement of the said prior art suffer from the limitation that all the measurement done are affected by the travelling speed of the articles. This limitation is a consequence that the multiple scanning beams are alternately operated on the same plane. For instance, when the prior art detecting arrangement is used to obtain lengths only object travelling time is actually measured and the time (or number of samples needed by the object to cross the scanning plane) an object takes to cross the measuring plane is inverse proportional to the object speed. Therefore, if the object speed changes, the travelling time also changes accordingly and so the calculated lengths. An even worse error occurs when calculating an integrating volume of the object as the volume follows a cubic proportion with the sampled signal.

Disadvantageously, the measurements according to the prior art are accurate as far as the speed of the articles is constant, which does not hold true, as it is determined by the bias that the articles receive from feeding means upstream the passageway. Actually, feeding means are configured to impart a bias to the articles which is different depending on whether the articles are the first ones or the last ones that are intended to be gathered in a batch. Usually, the first articles of a batch are biased into the passageway and towards a collecting station with a higher speed whereas the last articles of a batch are biased into the passageway and towards the collecting station with a lower speed in order not to erroneously feed more articles than needed that would not be effectively sorted in their way to the collecting station.

Moreover, the prior art techniques do not allow to correctly recognize joined articles, i.e. articles that could travel along the passageway in an attached fashion or very close to each other, and consequently to separate the articles downstream if they are intended to different batches.

Therefore, there is a need in this technical field to optimize the techniques for detecting and counting articles conveyed along a path.

The main objective of the present invention is to improve the prior art methods and systems for detecting and counting articles, and specifically to provide a method and an arrangement for detecting and counting articles whose accuracy is independent of the travelling speed of the articles as well as of the mutual arrangement the articles.

The above and other objectives and advantages, which will be better understood hereinafter, are achieved according to the present invention by a method for detecting and counting articles having the features defined in the appended claims.

Specific embodiments are the subject of the dependent claims, whose content is to be considered as an integral part of the present description.

A further subject of the invention is an arrangement for detecting and counting articles as claimed.

A still further subject of the invention is a computer program comprising a program code arranged to perform a method for detecting and counting articles as claimed.

Another subject of the invention is a system for sorting articles as claimed.

In summary, the present invention is characterized in that a detecting station is provided that comprises first and second detecting arrangements, each one emitting a respective scanning radiation beam, for example a light beam, which are arranged at a predetermined distance along the direction of travel of the articles through the passageway, so that they define two spatially separated scanning planes at respective cross sections of the passageway.

Each detecting arrangement comprises a radiation source arranged for emitting a scanning radiation beam on a respective scanning plane, and a radiation sensor facing the radiation source and arranged for picking the scanning radiation beam on the scanning plane.

Preferably, the radiation sources of both the detecting arrangements are simultaneously activated and even more preferably the radiation sources of both the detecting arrangements are constantly on.

The arrangement of a pair of scanning beams at a predetermined distance along the direction of travel of the articles through the passageway advantageously allows for detecting at least a predetermined reference section of the article, such as the leading (or front) edge and/or the trailing (or tail) edge of each article, twice and for directly calculating the travelling speed of each article so that a more accurate detection of the length of the article is obtained, which is needed for counting articles, as well as for detecting defective articles, i.e. articles with a dimension not corresponding to the desired one, and a more accurate estimation of the following position of the article may be carried out, which is important for sorting purposes.

Moreover, the arrangement of a pair of scanning beams at a predetermined distance along the direction of travel of the articles even more advantageously allows to resolve the condition that two articles are very close or even joined together at a scanning plane by detecting the mutual position of the two articles at two separated scanning planes. Two articles are considered to be joined when the trailing edge of an article is contacted by the leading edge of a following article or when the leading edge of an article is very close to the trailing edge of the preceding article and the separation gap between the two is presented in front of a relevant scanning plane between two consecutive samples and cannot be perceived.

By knowing the correct position and travelling speed as well as the expected length of an article, it is possible to know where an article actually is at the detecting station and estimate where it will be in the near future along the passageway so that downstream handling means for sorting purposes may be possibly actuated, the handling means comprising for example diverting means, such as an air blow, a gate or the like, to let a first one of a pair of very close or joined articles to pass towards a first batch and to deviate the second one of the pair of very closed or joined articles to a different batch in the case where a combined object made of a plurality of articles shall be sorted in different batches.

In the currently preferred embodiment the radiation is an optical radiation, more preferably visible light, but the detecting arrangements may include scanning ultrasonic beams as an alternative, without departing from the scope of protection which is defined by the appended claims.

Conveniently, the scanning radiation beams are mutually orthogonal so that the shape and volume of an article may be also detected and an article may be located at a precise position on the cross area of the passageway, so that downstream handling means, such as diverting means to different batches, may be actuated only for the needed travel, thus saving time and energy in the activation of said handling means.

The distance between the scanning planes may be chosen independently of the expected length of the articles, and particularly it can be longer or shorter than the length of the articles.

These and further features and advantages of the invention will become apparent from the following detailed description, given by way of non-limiting example, of a preferred embodiment thereof. Reference is made to the accompanying drawings, in which.

Figure 1:
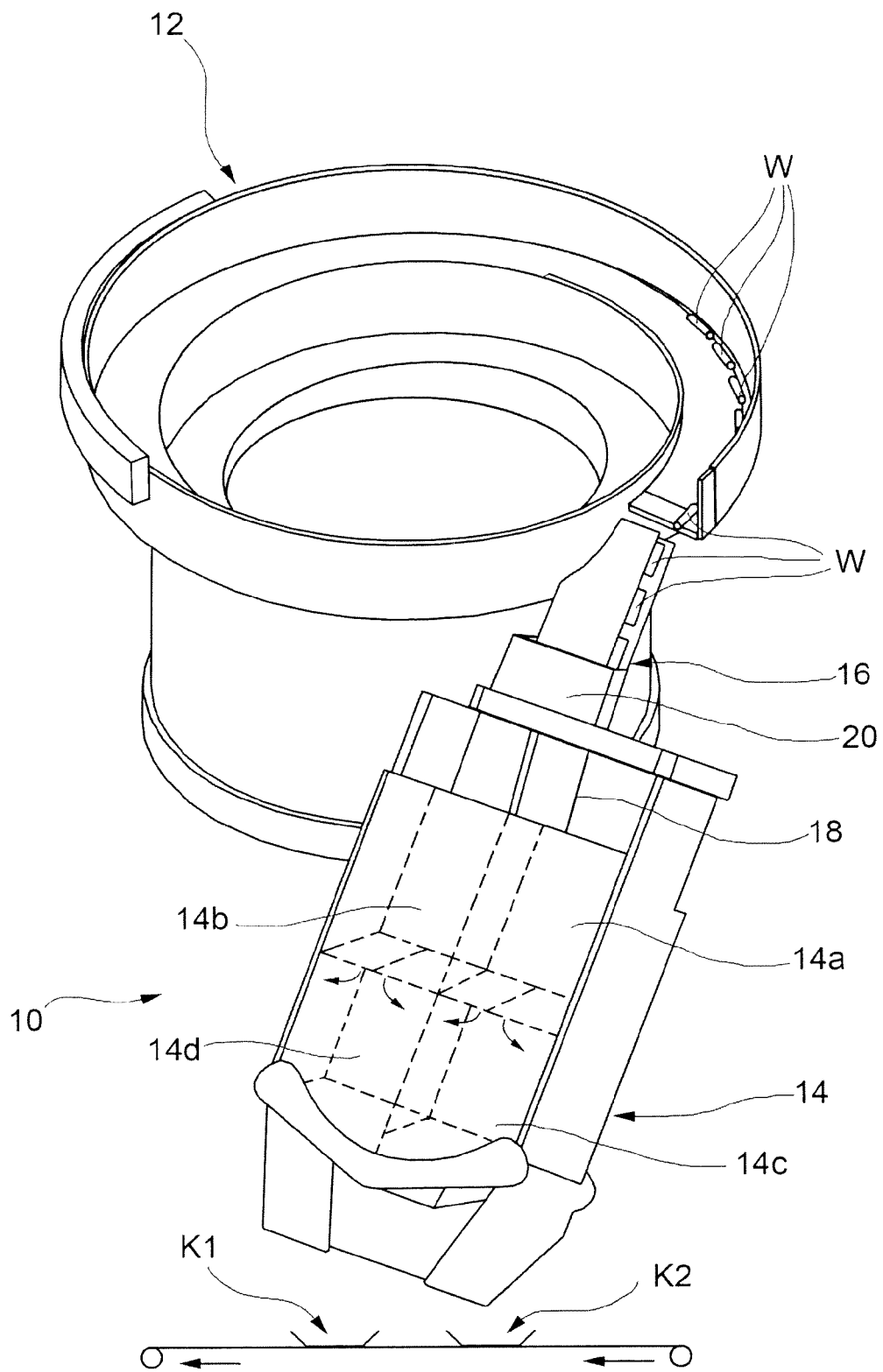
FIG. 1 is an exemplary representation of a system for sorting articles.

Referring initially to FIG. 1, reference numeral 10 generally designates a system for sorting articles, e.g. for sorting articles in batches.

A system for sorting articles in batches includes feeding means 12, such as a vibrator unit, a rotating table or any kind of mechanism arranged for receiving a number of articles W, preferably of the same type, i.e. having the same shape and dimensions, and for supplying them in series to a buffer collecting unit 14 where they are gathered in batches, for example with feeding throughputs from 25 to 2500 pieces/minute.

A known buffer collecting unit is, for example, a unit housing a plurality of batch compartments (four compartments 14*a*-14*d* are depicted by way of example in FIG. 1) adapted to receive batches of articles and to convey them to downstream containers K1, K2, . . . , such as buckets, for delivering to a production site or at a sale site, or even receive defective articles that has to be redirected to a reject path. Compartments 14*a*-14*d* in a buffer collecting unit are selected so that when at least a first compartment is filled with the number of articles of a predefined batch a second compartment is selected without interrupting the operation of the sorting system. Containers K1, K2, . . . downstream the buffer collecting unit 14 are handled so that when a container is filled with a predefined number of batches it is moved to a further station and substituted by an empty container ready to receive the predefined number of batches.

The feeding means 12 are connected to the collecting means 14 by means of a passageway 16, usually a sloped conveying duct which guides a continuous fall of articles from the feeding means above it to the collecting unit below it.

The articles are sorted between the batch containers in the collecting unit by means of article handling means 18 arranged downstream the passageway, such as a diverter flap, an air flow, a gate or the like.

Figure 2:
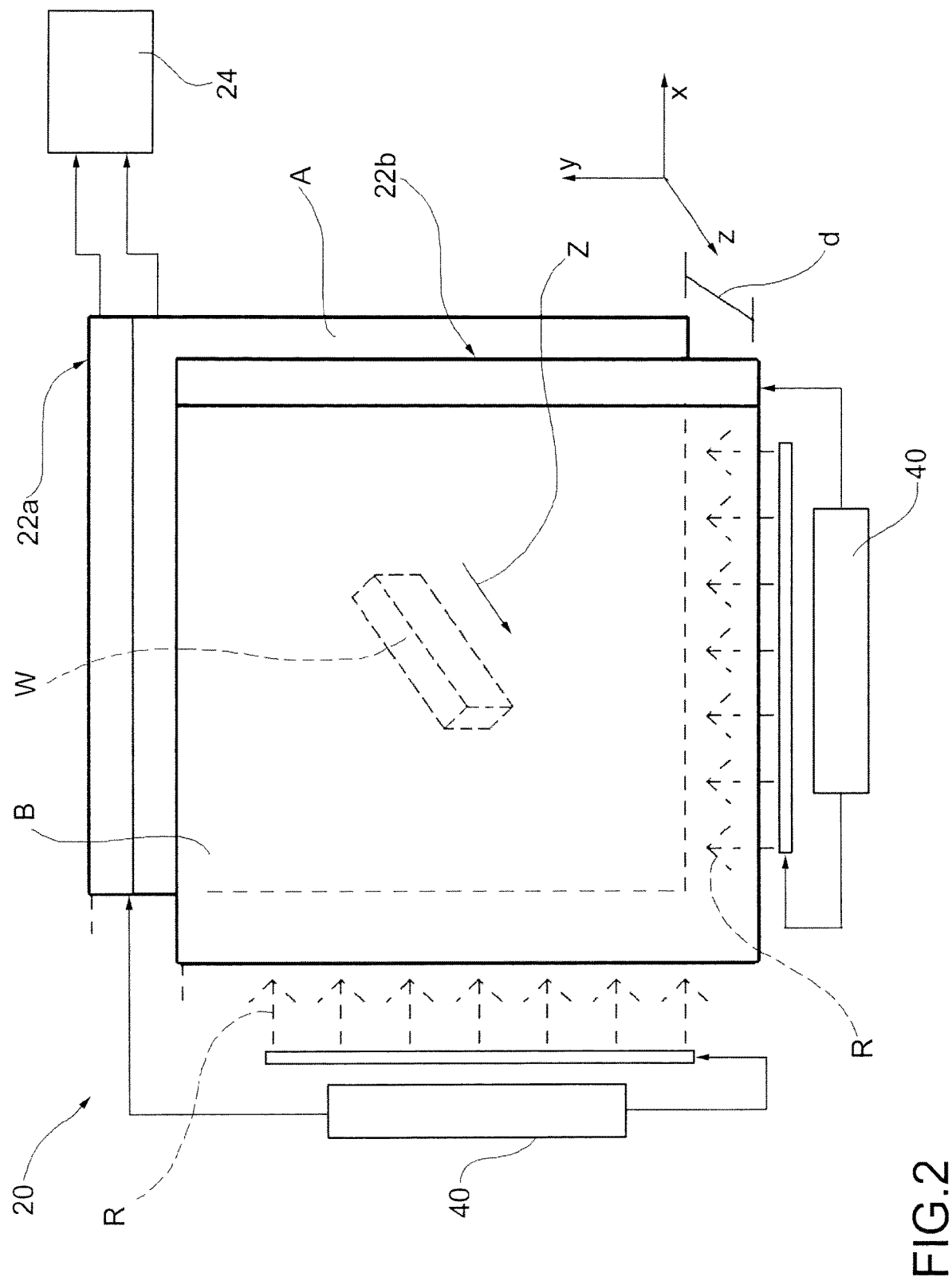
FIG. 2 is a schematic representation of a detecting station according to the invention.
Figure 3:
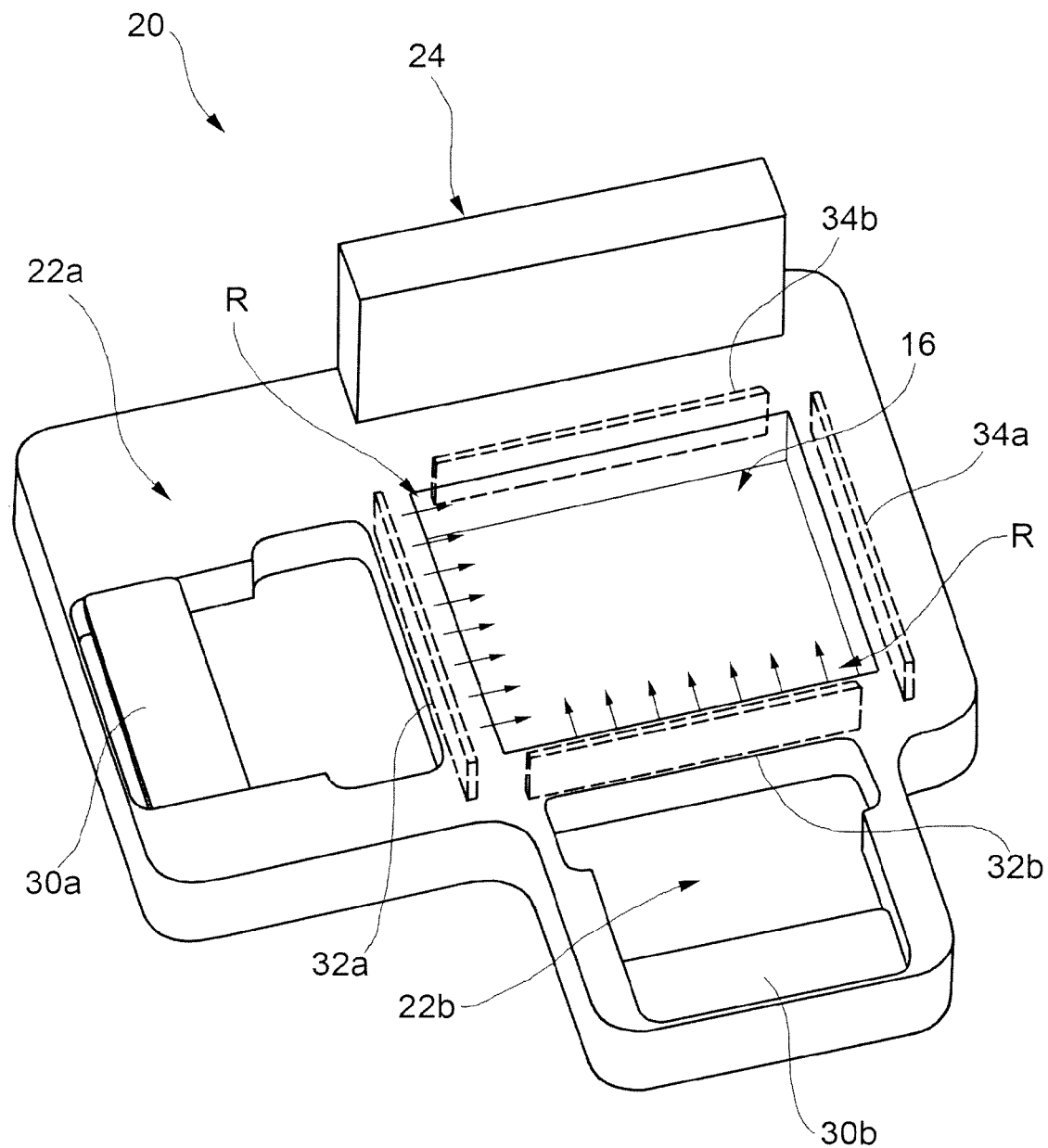
FIG. 3 is an exemplary representation of the detecting station of FIG. 2.

A detecting station 20 for detecting and counting articles is coupled to said passageway 16 and is schematically shown in FIG. 2 and depicted in an exemplary embodiment in FIG. 3.

According to the present invention the detecting station 20 includes first and second detecting means 22*a*, 22*b* arranged at different planes (indicated as scanning planes A and B, respectively) separated by a predetermined distance d along the direction of travel of the articles W through the passageway (indicated by an arrow), as well as a processing unit 24 coupled to the detecting means 22*a*, 22*b*.

The first and second detecting means 22*a*, 22*b* respectively include, as is best shown in FIG. 3, at least a radiation source 30*a*, 30*b*, such as a LED light source element, for emitting a scanning radiation beam R, such as a light beam, through an associated lens 32*a*, 32*b*, the scanning radiation beam R extending across a plane substantially orthogonal to the direction of travel of the articles W, and a respective facing radiation detector 34*a*, 34*b*, such as a light sensor element or an array of light sensor elements arranged to gather the scanning light beam. A single radiation source for emitting a scanning radiation beam R on both the scanning planes A and B, as well as and a single radiation detector arranged to gather the scanning light beam R from both the scanning planes A and B, may be used provided that the scanning radiation beam R is correctly directed to/from each scanning plane by respective beam shaping/guiding means.

According to a preferred embodiment, two collimated light sources 30*a*, 32*a* and 30*b*, 32*b* are used for generating the two independent scanning planes A, B separated by a distance of 7.8 mm along the article travelling axis (axis Z in FIG. 2). Opposite to the light sources two high resolution optical linear arrays 34*a*, 34*b* are positioned so the shadow created by the passing article can be measured, each linear array being composed of 640 elements (pixels) with a density of 8 pixels/mm. Both the optical linear arrays are scanned simultaneously at their maximum speed (e.g. a sampling period of 128 □s) sequentially from the first pixel to the last in order to create two high resolution images representing the object shape and its position along the X and Y axis.

The two scanning planes A, B can be placed with any possible mutual orientation as they are independent of each other. In the most common configuration these are rotated 90 degrees apart in order to have two orthogonally views of the articles to be measured.

A control unit 40 is coupled to each radiation source 30*a*, 30*b* and to each radiation detector 34*a*, 34*b* of the first and second detecting means. The control unit 40 is arranged for controlling activation of the LED light source elements 30*a*, 30*b*, e.g. for controlling continuous emission of the scanning radiation. The control unit 40 is also arranged for controlling activation of the light sensor elements 34*a*, 34*b*, e.g. for controlling detection of the scanning radiation at a predetermined scanning rate. Detection of the scanning radiation at each pixel (sensor element of the array) is converted into an electric signal which is processed at the processing unit 24 in real time as will be detailed in the following. Specifically, the quantity of radiation that is detected by each radiation detector 34*a*, 34*b* provides to the processing unit 24 electric signals representative of the projection of the cross section of the detected article W on the respective scanning plane A, B at each sample.

The position of the scanning planes A, B at a known distance "d" allows the processing unit 24 to calculate the speed of the article W from the measured time needed by the article to travel that distance, as it will be detailed in the following. The position of the scanning planes A, B at a known distance "d" allows also to measure the length and possibly the volume of each article W independently of the article travelling speed as it will be detailed in the following.

Articles W passing through the detecting station 20 are tracked as they move from the first scanning plane A of the first detecting means 22*a* to the second scanning plane B of the second detecting means 22*b*, in real time and one or more samples are generated with a predefined sampling period at each scanning plane A, B. A sample is an image taken by the detecting means scanning the passageway when they detect that partial radiation is received at the sensor elements, i.e. an article is travelling past the scanning plane that causes partial shading of the radiation emitted by the source element. The number of samples related to an article multiplied by the sampling period is the time length of that article detected at one of the pair of detecting means 22*a*, 22*b*.

Since for each article W both the leading edge and the trailing edge are tracked, in the following description "T1" is used to indicate the number of sampling periods taken by the article leading edge (front) to travel the distance "d" and "T2" is used to indicate the number of sampling periods taken by the article trailing edge (tail) to travel the same distance. The sampling period is herein used as a sort of clock of the arrangement.

A first, respectively second travelling speed of each article is computed in real time for the leading (front), respectively trailing (tail) edge of the article W when passing across each scanning plane A, B by applying the well-known classic physical relation, i.e. by dividing the known distance "d" between the two scanning planes, which is determined a priori, by the time taken by the leading (front) and trailing (tail) edge, respectively, of the article W to travel that distance.

An average speed is calculated from the first travelling speed of an article calculated with reference to the leading edge of the article and the second travelling speed of the article calculated with reference to the trailing edge of the article.

An instantaneous length is calculated from the first travelling speed computed for the leading edge of the article at the time an article crosses the second detecting means at scanning plane B, based on the time length of the article detected at scanning plane B.

An average length is also calculated from the average travelling speed, based on the time length of the article detected at scanning plane B.

The difference between the first and second travelling speeds of an article calculated with reference to the leading edge of the article and to the trailing edge of the article, over the time used by the article to travel across the second detecting means at scanning plane B is also representative of the acceleration or deceleration of the article through the detecting station 20.

The expression for the first travelling (or initial) speed, the second travelling (or final) speed and the average speed, for the acceleration (deceleration), for the instantaneous and average length and for the volume of an article are the following:

First (initial) travelling speed (of the leading edge):

$$v_1 = \frac{d}{T1}$$

Second (final) travelling speed (of the trailing edge):

$$v_2 = \frac{d}{T2}$$

Average speed (average between first travelling speed and second travelling speed):

$$v = \frac{d}{((T1+T2)/2) * p}$$

Acceleration/deceleration:

$$a = \frac{(d/T2 * p) - (d/T1 * p)}{L2 * p}$$

Instantaneous length (at scanning plane A):

$$L_A = L1 * \frac{d}{T1}$$

Instantaneous length (at scanning plane B):

$$L_B = L2 * \frac{d}{T1}$$

Average length:

$$L = \frac{L2 * 2d}{T1 + T2}$$

Volume:

$$V = \frac{X_{area} * Y_{area} * d}{T2 * p}$$

where:
d is the distance between scanning planes A and B;
T1 and T2 are the number of sampling periods taken by the article leading edge, respectively trailing edge to travel the distance "d";
L1 and L2 are the number of sampling periods taken by the article to cross scanning plane A, respectively B, which is representative of the length of the article as detected across scanning plane A, respectively B (indicated $L_A$, $L_B$);
p is the time duration of the sampling period;
$X_{area}$ and $Y_{area}$ are the areas of the article obtained by integrating the detected shadow of the article at each cross section travelling across the first and second detecting means, respectively.

The tracking of the articles as they move from scanning plane A to scanning plane B in a normal situation is the following, assuming that the article's length is greater than distance "d" between the scanning planes A, B. An article W arrives at the detecting station 20 and its leading edge crosses plane A, then its leading edge crosses plane B, then its trailing edge leaves plane A and finally the trailing edge leaves plane B.

In real operation the behavior of an article freely travelling along the passageway can deviate from the above theoretical scenario and need to be addressed in order to provide an effective sorting system.

For instance, objects shorter than the distance between the scanning planes need to be handled, either because it is desired by design or because they are unexpected items that mixes with the articles to be processed.

Another operating condition to be taken into account is the one that can occur due to the feeding means biasing of the articles and consequent article deceleration or acceleration. It is possible that two articles detected at plane A come very close to each other or even join to create one combined object when they cross plane B. The condition that two (or more) articles form a combined object is assessed by checking the instantaneous length of an object calculated at scanning plane A before the combined object crosses plane B. If said instantaneous length is greater than "d" and the preceding article tail has not crossed scanning plane B yet, than two joined articles are detected. It is also possible that two articles are very close to each other or even joined to create one combined object when they cross both plane A and plane B. It is also possible the opposite, that two very close or joined articles forming a combined object at plane A be separated due to acceleration of the preceding one and be detected as separate items at plane B.

A state machine driven by the events on the two scanning planes has been designed to address the above different possibilities, e.g. that articles shorter than an expected nominal length be identified and correctly sorted, or that two articles on plane A come very close or join as one object on plane B, or that two very close or joined articles at plane A be separated at plane B, and to ensure that possible errors that can affect the correct measurement are dealt with.

The method according to the invention is further disclosed in the following paragraphs with reference to FIGS. 4 and 5a-5c.

Figure 4:
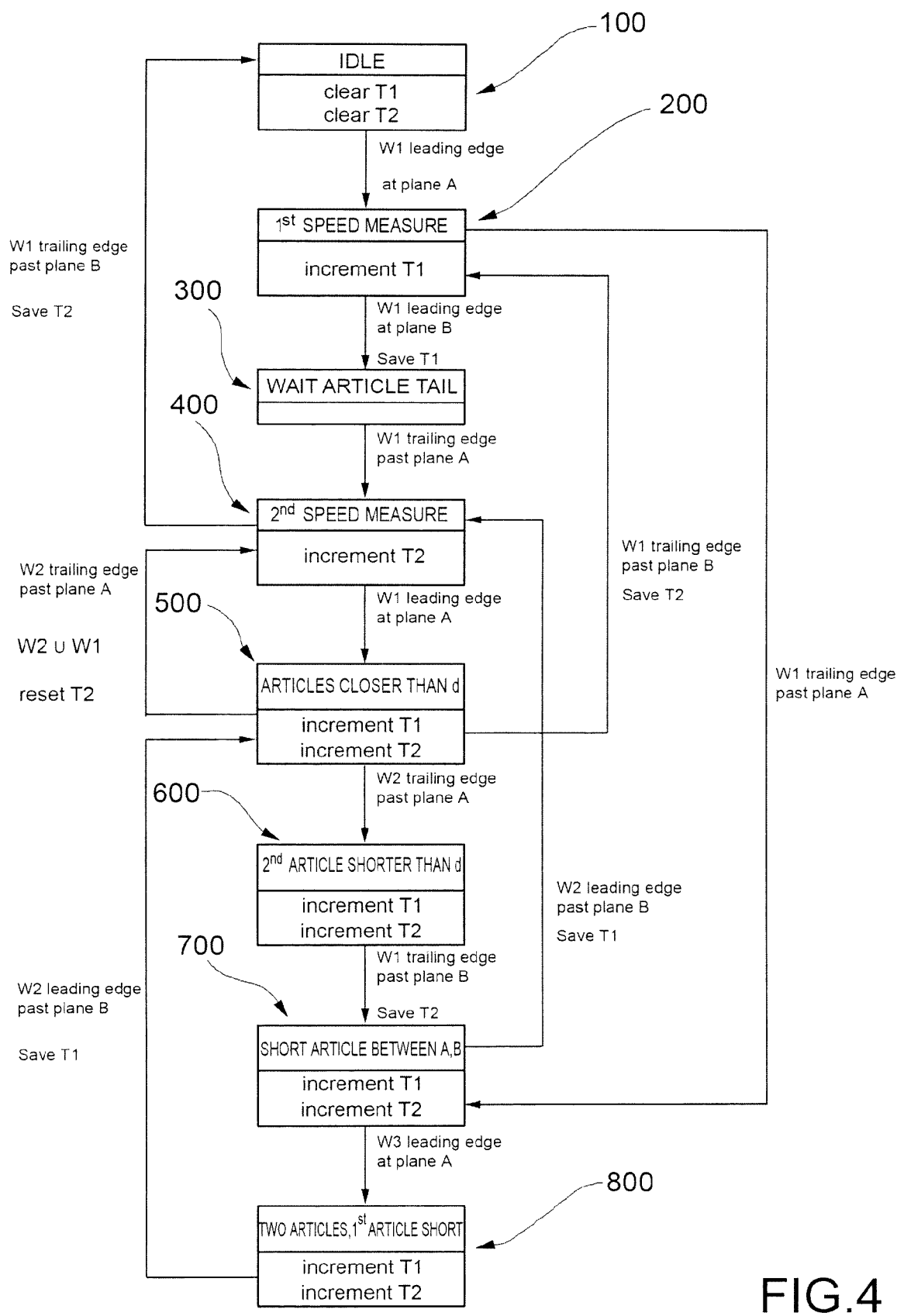
FIG. 4 is a diagram of a state machine for implementing the detecting and counting method according to the invention.

FIG. 4 shows the state diagram used by the processing unit 24 to track the article movement within the scanning planes and applies to the case where a single article or two articles, joined together or separated, travel through the detecting station.

Figure 5A:
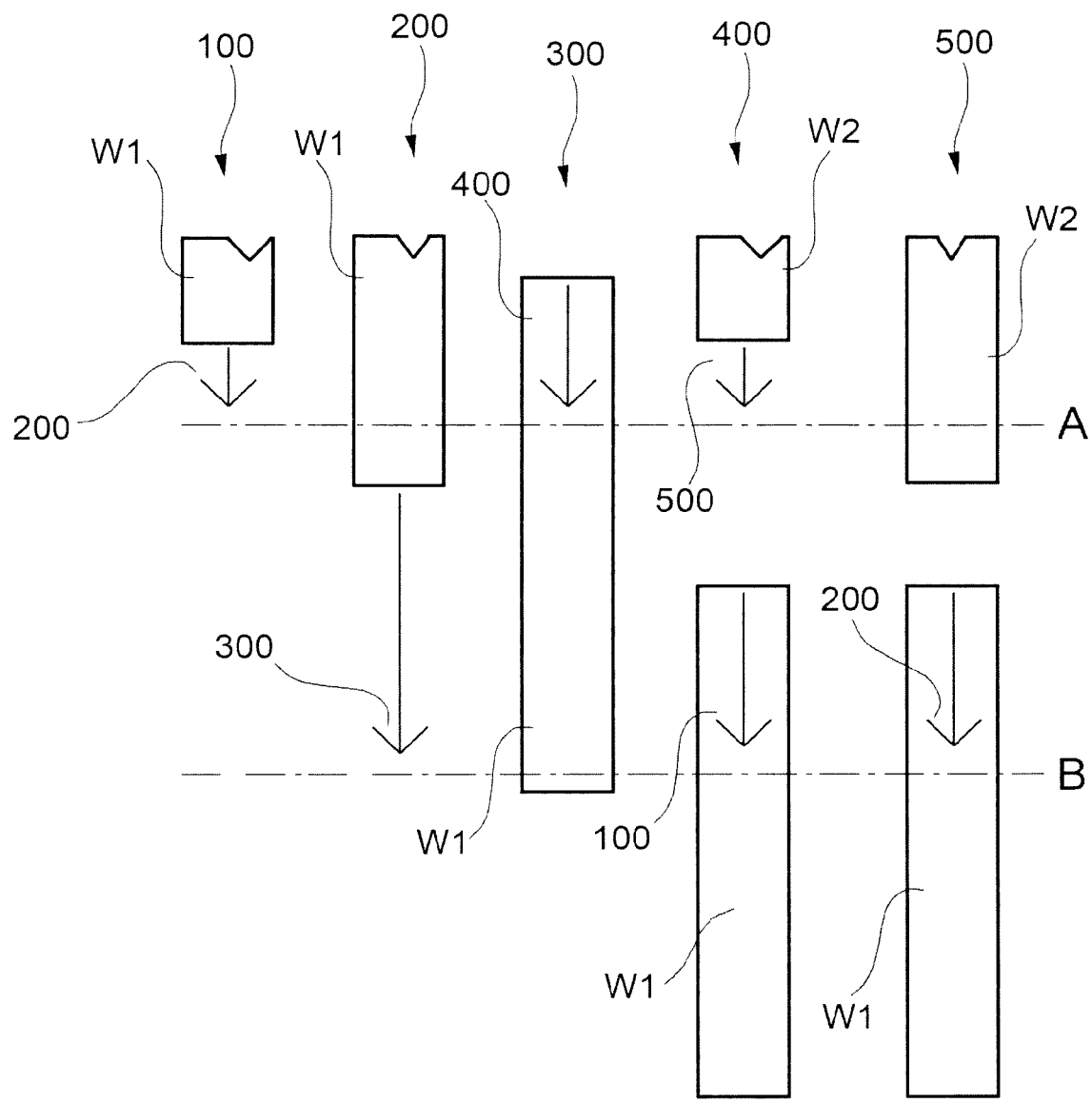
FIG. 5a, 5b, 5c are diagrams representing articles travelling across the detecting station in exemplary operation conditions of the state machine in FIG. 4.
Figure 5B:
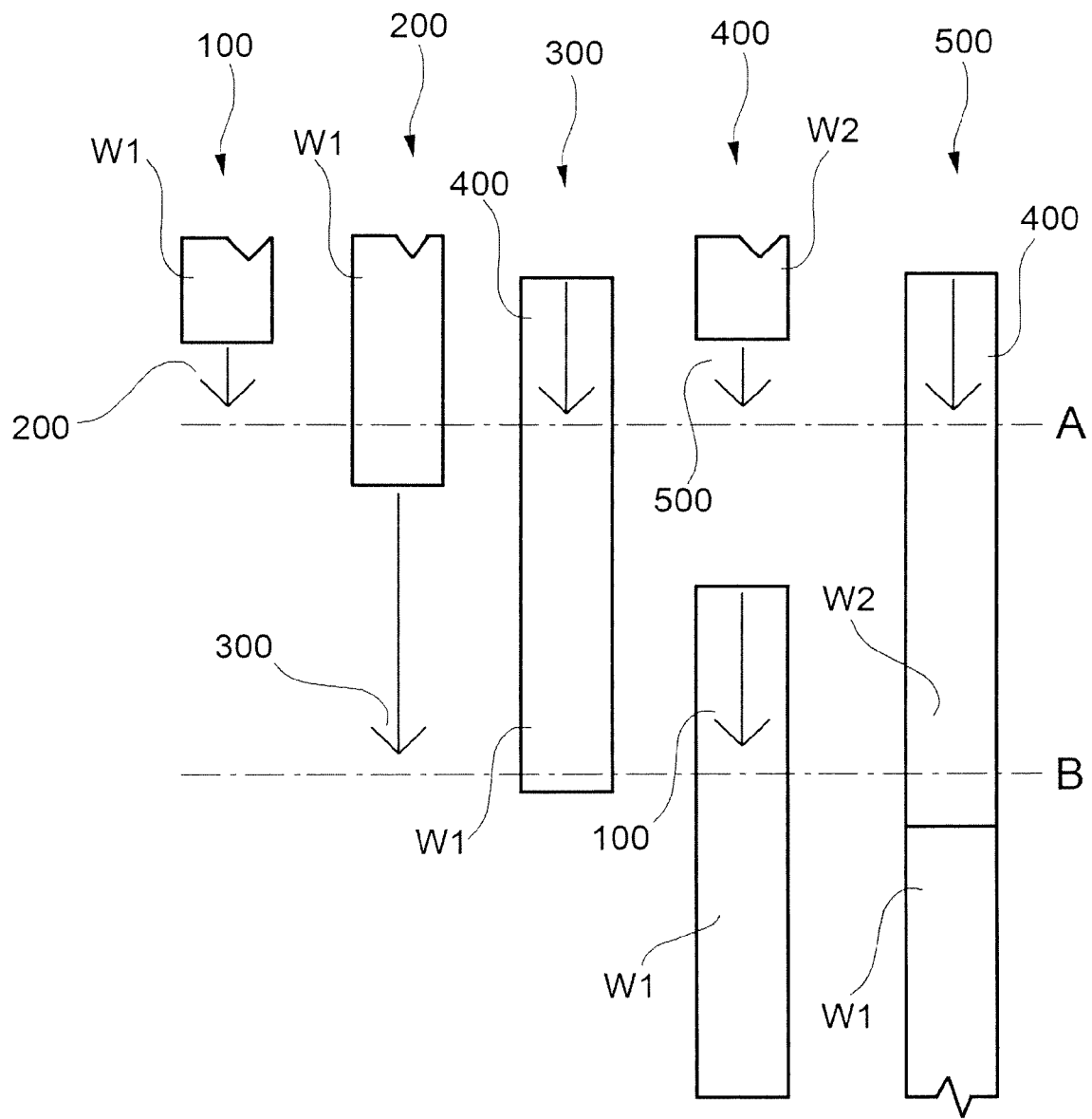
Figure 5C:
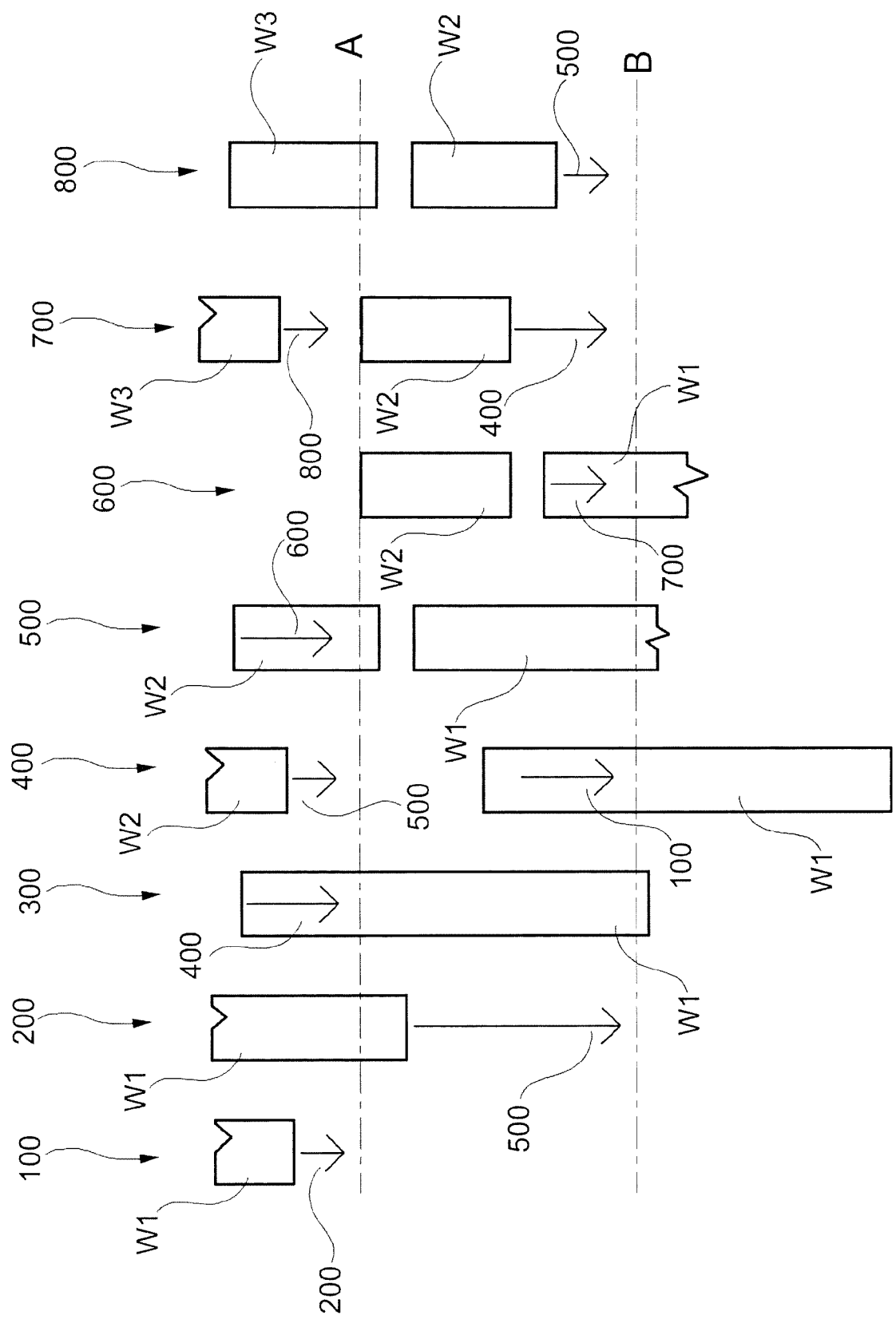

The number of sampling periods T1 and T2 is generally used in the state diagram of FIG. 4. FIGS. 5a-5c are diagrams schematically representing articles travelling across the detecting station in the states identified in FIG. 4, where the next state is indicated by the arrows from the leading edge and/or the trailing edge of the articles. In the following description the number of sampling periods taken by each article in its travelling through the detecting station will be indicated T1' and T2' when referring to a first article, T1" and T2" when referring to a second article, and so on.

The normal operating condition is discussed in the following. This exemplary operating condition is schematically depicted in the diagram of FIG. 5a, where the travel of two consecutive articles W1 and W2 between scanning planes A and B is sketched.

At state 100, before receiving any article the processing unit is in an idle state, where time variables T1 and T2 are reset or cleared.

When the leading edge of a first article W1 is detected at plane A of the first detecting means the processing unit moves to state 200 and it starts measuring the number of samples T1', e.g. by incrementing a first time counter, i.e. a time counter associated with the leading edge of the article.

When the leading edge of the first article W1 is detected at plane B of the second detecting means before the trailing edge be detected at plane A, the processing unit stores the number of samples T1' and moves to state 300 where it waits for the trailing edge of the article W1 to cross plane A, under the assumption that a nominal length of the expected articles be greater than distance "d" between scanning planes A and B.

As the trailing edge of the article W1 leaves plane A, i.e. the article has definitely left the first detecting means, the processing unit moves to state 400 and it starts counting the number of samples T2', e.g. by incrementing a second time counter, i.e. a time counter associated with the trailing edge of the article.

If the trailing edge of the article W1 leaves plane B, i.e. the article has definitely left the second detecting means, the processing unit stores the value of the number of samples T2' and moves to state 100 waiting for another article.

If, alternatively, the leading edge of a second article W2 is detected at plane A of the detecting means before the trailing edge of the first article W1 be detected at plane B, the processing unit moves to state 500 in the condition where two articles (W1, W2) are travelling through the detecting station at a distance closer than the distance separating the two detecting means (scanning planes A and B). In this state the processing unit starts counting the number of samples T1" referred to the second article W2, e.g. by incrementing the first time counter, while still incrementing the second time counter for the first article W1.

If the trailing edge of the first article W1 leaves plane B in the meantime, i.e. the first article has definitely left the second detecting means, the processing unit stores the number of samples T2' and moves to state 200 incrementing the first time counter of T1" with reference to the second article W2.

The evolution of the state machine between states 100, 200, 300, 400, 500 and back to 200, disclosed above, represents the normal operation of the arrangement of the present invention, when a sequence of separated articles is detected.

The operating condition that two (or more) articles form a combined object is discussed in the following. This exemplary operating condition is schematically depicted in the diagram of FIG. 5b, where the travel of two consecutive articles W1 and W2 between scanning planes A and B is sketched.

At state 500, if the trailing edge of the second article W2 leaves plane A, i.e. the article has definitely left the first detecting means, and the second article W2 is very close or joined to the first one W1, the processing unit moves back to state 400 and restarts counting the number of samples T2, now T2".

The evolution of the state machine between states 100, 200, 300, 400, 500, disclosed in the foregoing, represents the operation of the arrangement of the present invention when two very close or joined articles are presented at the detection station, in this specific embodiment when two articles travelling a different speeds are separated at the first scanning plane A, but come very close or join before reaching the second scanning plane B whereby the trailing edge of the first article and the leading edge of the second article cannot be detected anymore at said second scanning plane B.

The occurrence of very close or joined articles is handled by the processing unit 24 according to a specific algorithm arranged to resolve the joined condition as far as possible, based on the properties of the arrangement that articles can be accurately tracked along the passageway, even downstream the detecting station, once their travelling speed and length are known.

When articles very close or joined to each other are presented in front of the first and/or second detecting means so that a combined object is detected, at least the instantaneous full length of the combined object is calculated by the processing unit 24 from the first travelling speed of the leading edge past the two scanning planes A and B and the time used by the combined object to cross scanning plane B. When the instantaneous length of the combined object reaches a predetermined nominal length of an expected article the arrangement increases the count of articles by one and registers this position as the trailing edge of a virtual article. The virtual article is handled as a single article and the processing unit 24 issues a control signal to the handling means 18 so that the virtual article is directed to the respective compartment. The batch to which the virtual article is assigned is marked as still to be validated. This procedure may continue until the instantaneous length of the combined object reaches again the nominal length of an expected article, whereby the arrangement increases the count of articles by one again and registers this position as the trailing edge of a second virtual article, and so on. When actual detection of the trailing edge of the combined object is detected at scanning plane B the processing unit 24 checks if the calculated full length of the object is a multiple of said predetermined nominal length of the articles. In the affirmative, the batch or batches to which the virtual articles have been assigned are validated. In the negative, i.e. where the full length of the combined object is not a multiple of the nominal length, the processing unit 24 cannot determine how many expected articles are joined in the combined object and/or where in the combined object an article with a different length is located. The processing unit 24 then issues a control signal so that the batch or batches to which the virtual articles have been assigned are rejected.

This makes it possible to run the arrangement at higher sorting speeds and to correctly sort more batches of articles compared with the prior art systems.

The operating condition that articles shorter than an expected nominal length be detected is discussed in the following. This exemplary operating condition is schematically depicted in the diagram of FIG. 5c, where the travel of three consecutive articles W1, W2 and W3 between scanning planes A and B is sketched.

At state 500, if the second article W2 is shorter than the distance separating the two detecting means (scanning planes), the processing unit moves to state 600 still incrementing both the first and the second counter (i.e. T1" and T2') for the second article W2 and the first article W1, respectively.

As the trailing edge of the first article W1 leaves plane B, i.e. the first article has definitely left the second detecting means, the processing unit stores the number of samples T2' and moves to state 700 incrementing both a first time counter T1" and a second time counter T2" with reference to the second article W2.

The processing unit reaches state 700 also if the leading edge of the first article W1 is detected at plane B of the second detecting means after the trailing edge has been detected at plane A at state 200.

State 700 indicates that a short article W2 (i.e. an article whose length is shorter than the length of the other articles and shorter than the distance between the scanning planes) is travelling between the first and the second detecting means.

When the leading edge of the second article W2 is detected at plane B of the second detecting means, the processing unit stores the number of samples T1" and moves to state 400 where it keeps counting the number of samples T2", e.g. by incrementing a second time counter.

If the leading edge of a further article W3 is detected at plane A of the detecting means the processing unit moves to state 800 still incrementing both the first and the second counter (i.e. T1" and T2") for the third article W3 and the second article W2, respectively.

From state 800 the processing unit moves to state 500 when the leading edge of the further article W3 is detected at plane B of the second detecting means, in the meantime storing the number of samples T1".

The evolution of the state machine between states 100-800, disclosed above, represents the operation of the arrangement of the present invention when a sequence of separated articles is detected, wherein an article is shorter than the others and shorter than the distance between the scanning planes.

The condition at states 500-800 can take into consideration either the case where a short article is a defective article, i.e. it is out of tolerance from the expected nominal length and it shall be discarded (or the batch including it shall be rejected), or the case where a short article is a different type of article to be sorted (e.g. supplied from different feeding means), that shall be collected in a different buffer compartment of the collecting means.

The state diagram of FIG. 4 takes into account any possibility that may occur depending on the length of articles and their mutual distance.

In conclusion, the arrangement and method according to the invention advantageously allows to compute in real-time (on the fly) the initial and final speed and the instantaneous length of each article. The initial/final speed is calculated based on the time of travel of the leading/trailing edge of the article across the distance "d" (across the scanning planes A, B). The instantaneous length is calculated based on the calculated speed of the leading edge of the article (once it has reached scanning plane B) and the time used by the article to travel past a scanning plane. The instantaneous length at scanning plane B can be calculated by the processing unit 24 progressively as the article travels across the second detecting means.

Moreover, the arrangement and method according to the invention allows to compute the average speed and length of each article after it has completely passed through the detecting station. The average speed is calculated based on the time of travel of both the leading edge and the trailing edge of the article across the distance "d" (across the scanning planes A, B). The average length is calculated once the average travelling speed is known at the time an article leaves the detecting station by converting the time length of the article detected at scanning plane B, into a distance based on the calculated average speed.

Count of articles is obtained by the processing unit 24 after an article (or a combined object) has crossed past both the first and second detecting means, i.e. as soon as the article/combined object has travelled past scanning plane B, which is detected by detecting the trailing edge thereof. Whether the determined length of the object corresponds to the nominal length of an article a single article is counted. Whether the determined length of the object corresponds to a multiple of the nominal length of an article a corresponding plurality of articles is counted.

Combining the length (position along Z axis) with the information from the detecting means the following information about the article geometric features can be extracted in real time on the fly while the article is crossing the scanning planes, at each sampling period (e.g. at 128 µs in the currently preferred embodiment):

actual position across the X and Y axis
minimum and maximum width across X and Y axis
X and Y axis coordinate of the article
article's length
article's sectional area on plane A
article's sectional area on plane B
article's center of gravity (assuming that the article is made of an homogeneous material)
article's volume
article's speed (initial, final, average)
article's acceleration/deceleration The very high sampling frequency is the key for high performance of the arrangement that has an accuracy on the X and Y axis dictated by the linear array used (125 µm) and an accuracy on the Z axis within 1 mm for article speed as high as 2.5 m/s.

In more general terms, which are comprised within the scope of the invention, a first and a second reference section of the article, different from the leading and trailing edge thereof, may be used for implementing the method for detecting and counting articles according to the invention. For instance, a first and a second reference section of the article may have markings separated by a predetermined distance adapted to be detected by image recognition systems, which has a defined ratio to the full length of the object so that knowing said distance would allow for calculating the full length of the object as well.

Furthermore, additional scanning planes may be used to allow for detecting more complex situation of articles joined to each other, and make it possible to calculate a detailed travel speed curve instead of an average speed.

When a complete article leaves the detecting station 20 its position in the space along the two X/Y axis has been determined and its speed and acceleration have also been determined. With this information available in real time it is possible to predict where the article will be in the near future with accuracy of the order of magnitude of the millimeter, which allows to perform quite unique operations as:

- counting and handling articles having length between 2 and 120 mm, and travelling speed between 0.3 and 3 m/s;
- counting and handling multiple joined pieces;
- rejecting articles with geometric feature out of range;
- rejecting articles with good geometric feature but wrong physical position;
- generating a trigger signal when the article is in a desired position downstream the detecting station, to be used for controlling any downstream actuating means, such as handling means for diverting articles between different compartments of a buffer collecting unit;
- adjusting the position and the stroke of the downstream handling means according to the actual position of the article;
- accurately driving the downstream handling means for performing ejection, batching or sorting operations in general by compensating any mechanical delay associated with the inertia of the mechanical components of the diverting means.

Advantageously, the arrangement according to the present invention allows for a sorting rate of about 1500 articles per minute, which are divided correctly.

The processing unit includes a software-based control for performing the disclosed method.

Therefore, the invention also relates to a computer program, in particular a computer program stored in or conveyed by an information carrier, arranged to perform the method of the invention when run on the processing unit. The information carrier can be any entity or device capable of storing and/or conveying the program. For example, the carrier may be a storage physical product, such as a ROM memory, a RAM memory or it may be an electrical or optical signal, which can be transmitted through an electrical or optical physical connection, by radio signals or by other means, e.g. downloaded over a wide area network.

It shall be clear that the embodiments and implementation details may widely varied compared to what has been described and illustrated by way of non-limiting example only, without departing from the scope of the invention as defined by the appended claims.

The invention claimed is:

1. A method for detecting and counting articles, comprising the steps of:
   providing detecting means arranged along a passageway for the articles, the detecting means being adapted to establish at least a scanning radiation beam at a cross section of the passageway;
   passing articles past said detecting means, the detecting means detecting an article upon sensing at least a partial interruption of the scanning radiation beam; and
   obtaining a count of the detected articles through the passageway, wherein said detecting means include first and second detecting means arranged at a predetermined distance from each other along the direction of travel of the articles, which first and second detecting means establish a respective scanning radiation beam on a first, respectively second scanning plane at a corresponding cross section of the passageway, and
   in that the method comprises:
   passing articles past said first and second detecting means;
   detecting at least a first predetermined reference section of the articles at each scanning plane, the articles traveling at unknown and/or inconsistent speeds;
   calculating a travelling speed of each article based on the time used by said at least one reference section of the article to travel said predetermined distance between the first and the second scanning planes;
   detecting at least a second predetermined reference section of the articles, which is separate from the first reference section, at least at one of the first and second scanning plane;
   calculating a length of the article from the calculated travelling speed and by calculating the time used by the article to cross said at least one of said first and second scanning plane; and
   obtaining a count of the article when the calculated length corresponds to a nominal length of an article.

2. A method according to claim 1, comprising detecting the first reference section and the second reference section of each article at each scanning plane, and calculating a first, respectively a second travelling speed of the article based on the time used by the first reference section, respectively by the second reference section of the article to travel the predetermined distance between said first and second scanning planes.

3. A method according to claim 2, wherein an average speed of each article is determined as the average between said first and second travelling speed of the article.

4. A method according to claim 3, wherein calculating a length of each article comprises calculating an average length from the average speed based on the time used by the article to travel across one of the first and second scanning plane.

5. A method according to claim 2, wherein an acceleration or deceleration of each article is determined as the difference between the first and the second travelling speed of the article over the time used by the article to travel across one of the first and second scanning plane.

6. A method according to claim 1, wherein detecting a first and a second predetermined reference section of the articles comprises detecting the leading edge and the trailing edge of each article
   and wherein calculating a length of each article comprise calculating an instantaneous length from the first travelling speed based on the time used by the article to travel across one of the first and the second scanning plane
   and wherein the instantaneous length of a combined object comprising a plurality of joined articles is calculated and a count of virtual articles is obtained each time said instantaneous length of the combined object reaches a predetermined nominal length of an expected article or a multiple thereof, the method further comprising checking if the calculated full length of the combined object is a multiple of said predetermined nominal length, whereby in the affirmative the count of virtual articles is validated, otherwise the count of virtual articles is not validated.

7. A method according to claim 1, wherein said first and second detecting means comprise a respective radiation source arranged for emitting a scanning radiation beam on a respective scanning plane, and a respective radiation sensor facing the corresponding radiation source and arranged for sensing the corresponding scanning radiation beam on the respective scanning plane, the method preferably comprising activating simultaneously the radiation sources of the first and second detecting means.

8. A method according to claim 7, wherein the radiation sources of the first and second detecting means are constantly on.

9. A method according to claim 1, wherein the scanning radiation beams on said first and second scanning plane are mutually orthogonal
and wherein the radiation beam is a light beam.

10. A non-transitory computer readable medium having stored thereon software instructions that when executed by at least one processing unit causes the apparatus recited in claim 1 to perform a method for detecting and counting articles by executing the actions according to claim 1.

11. An arrangement for detecting and counting articles comprising:
a detection station including detecting means arranged along a passageway for the articles, the detecting means being adapted to establish at least a scanning radiation beam at a cross section of the passageway and to detect an article upon sensing at least a partial interruption of the scanning radiation beam; and
processing means configured for obtaining a count of the detected articles traveling through the passageway at unknown and/or inconsistent speeds,
wherein said detecting means include first and second detecting means arranged at a predetermined distance along the direction of travel of the articles, which establish a respective scanning radiation beam on a first, respectively second scanning plane at a corresponding cross sections of the passageway, and
in that the processing means are configured for detecting at least a first predetermined reference section of the articles at each scanning plane and for calculating a travelling speed of each article based on the time used by said at least one reference section of the article to travel said predetermined distance between the first and the second scanning planes,
the processing means being further configured for detecting at least a second predetermined reference section of the articles, which is separate from the first reference section, at least at one of the first and second scanning plane; and for obtaining a count of the articles when a calculated length corresponds to a nominal length, the calculated length being calculated from the calculated travelling speed and the time used by the article to cross said at least one of said first and second scanning plane.

12. An arrangement according to claim 11, wherein the processing means are configured tier detecting the first reference section and the second reference section of each article at each scanning plane, and for calculating a first, respectively a second travelling speed of the article based on the time used by the first reference section, respectively the second reference section of the article to travel the predetermined distance between the first and the second scanning planes.

13. An arrangement according to claim 12, wherein the processing means are configured for determining an average speed of each article as the average between said first and second travelling speed of the article.

14. An arrangement according to claim 13, wherein the processing means are configured for calculating an average length of each article from the average speed based on the time used by the article to travel across one of the first and second scanning plane.

15. Air arrangement according to claim 12, wherein the processing means are configured for determining an acceleration or deceleration of each article as the difference between the first and the second travelling speed of the article over the time used by the article to travel across one of the first and second scanning plane.

16. An arrangement according to claim 11, wherein said first and second predetermined section are a leading edge, respectively a trailing edge of the article
and wherein the processing means are configured for calculating an instantaneous length of each article from the first travelling speed based on the time used by the article to travel across one of the first and the second scanning plane
and wherein the processing means are configured for calculating the instantaneous length of a combined object comprising a plurality of joined articles and for obtaining a count of virtual articles each time said instantaneous length of the combined object reaches a predetermined nominal length of an expected article or a multiple thereof, the processing means being further configured for checking if the calculated full length of the combined object is a multiple of said predetermined nominal length, whereby in the affirmative the processing means are configured for validating the count of virtual articles, otherwise the processing means are configured for not validating the count of virtual articles.

17. An arrangement according to claim 11, wherein said first and second detecting means comprise a respective radiation source arranged for emitting a scanning radiation beam on a respective scanning plane, and a respective radiation sensor facing the corresponding radiation source and arranged for sensing the corresponding scanning radiation beam on the respective scanning plane, the radiation sources of the first and second detecting means being preferably activated simultaneously.

18. An arrangement according to claim 17, wherein the radiation sources of the first and second detecting means are constantly on.

19. An arrangement according to claim 11, wherein the scanning radiation beams on said first and second scanning plane are mutually orthogonal
and wherein the radiation beam is a light beam.

20. A system for sorting articles, comprising:
feeding means for supplying articles;
collecting means for gathering articles in batches, arranged downstream said feeding means;
a passageway between said feeding means and said collecting means;
an arrangement for detecting and counting articles, including:
a detection station including detecting means arranged along said passageway for the articles, the detecting means being adapted to establish at least a scanning radiation beam at a cross section of the passageway and to detect an article upon sensing at least a partial interruption of the scanning radiation beam, and
processing means configured for obtaining a count of the detected articles through the passageway; and
handling means arranged downstream the detecting station and responsive to said processing means, for sorting articles in batches to said collecting means,
wherein said arrangement for detecting and counting articles is an arrangement according to claim 11.

* * * * *